(No Model.) 2 Sheets—Sheet 1.
A. B. SMITH.
CALK SHARPENER AND HOOF TRIMMER.
No. 589,866. Patented Sept. 14, 1897.
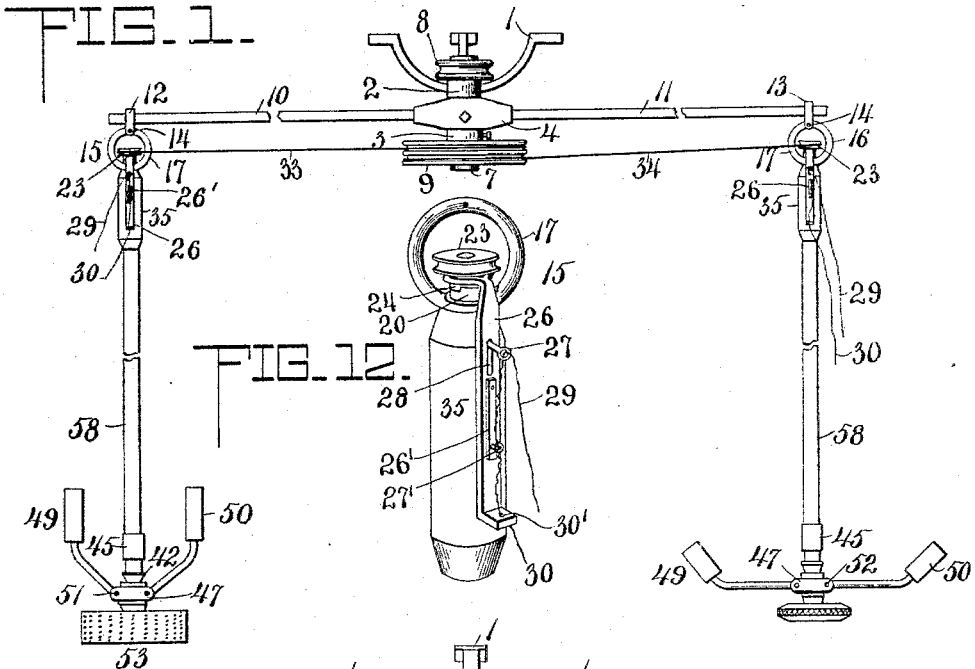
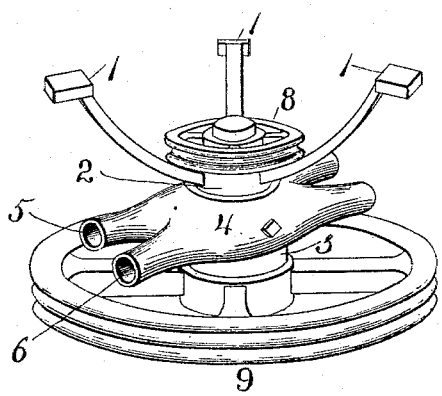
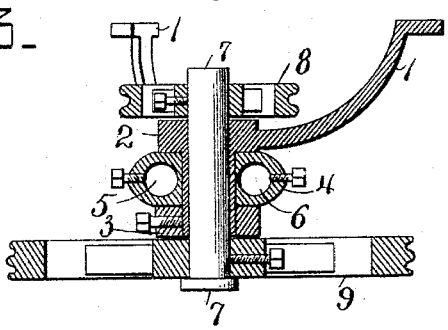
WITNESSES
W. E. Allen
A. M. Poynton
INVENTOR
Alvra Byron Smith.
By John Wedderburn
Attorney (No Model.) 2 Sheets—Sheet 2.
A. B. SMITH.
CALK SHARPENER AND HOOF TRIMMER.
No. 589,866. Patented Sept. 14, 1897.
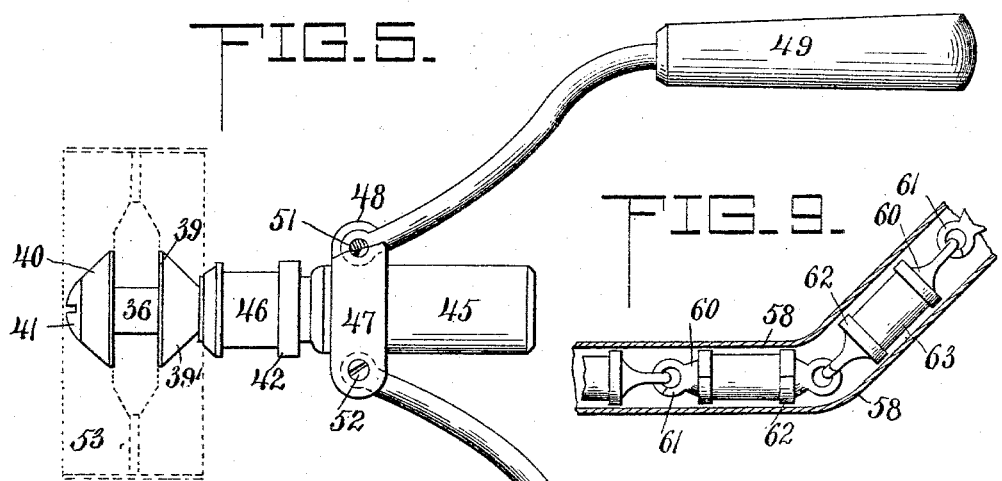
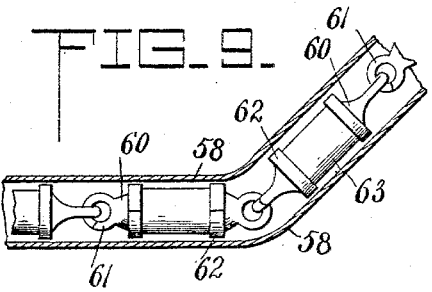
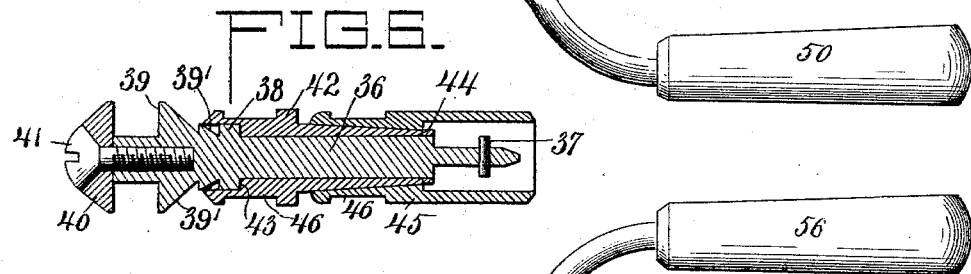
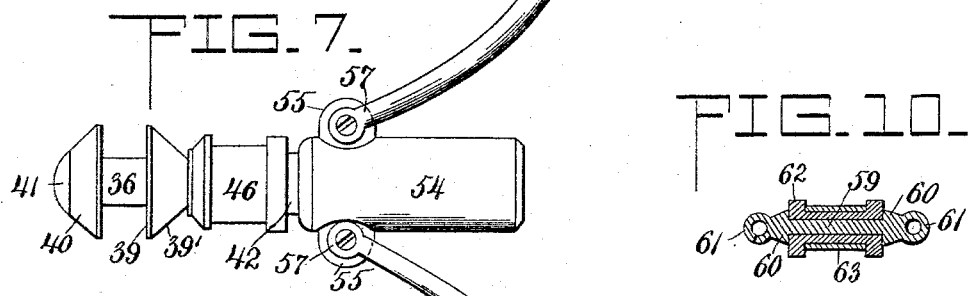
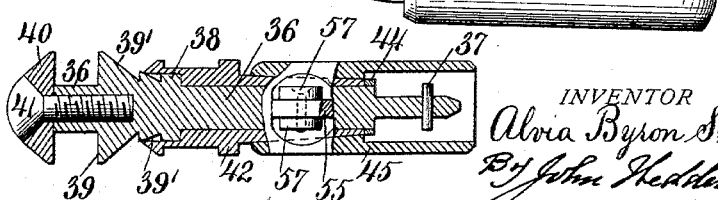
WITNESSES
W. E. Allen.
A. M. Layton.
INVENTOR
Alvia Byron Smith.
By John Hedderburn
Attorney

UNITED STATES PATENT OFFICE.

ALVIA BYRON SMITH, OF MIDDLEBURY, VERMONT.

CALK-SHARPENER AND HOOF-TRIMMER.

SPECIFICATION forming part of Letters Patent No. 589,866, dated September 14, 1897.

Application filed March 25, 1897. Serial No. 629,108. (No model.)

*To all whom it may concern:*

Be it known that I, ALVIA BYRON SMITH, of Middlebury, in the county of Addison and State of Vermont, have invented certain new and useful Improvements in Calk-Sharpeners and Hoof-Trimmers; and I do hereby declare the following to be a full, clear, and exact description of the invention, such as will enable others skilled in the art to which it appertains to make and use the same.

This invention relates to hoof-trimming and calk-sharpening devices.

My object is to provide an improved machine of the class described which will be adapted for more easy and rapid manipulation, so that any part of the horse's hoof can be cut or trimmed with rapidity and ease, and which will comprise independent sharpening and trimming devices, either or both of which can be used, so that if one should become damaged or cannot be used operations may still be continued with the other.

A further object is to provide a machine of the class described having flexible shafting and improved cutting and trimming devices and adjustable handles of novel construction, whereby the cutting or trimming tool can be properly directed.

A still further object is to provide an improved flexible shafting especially adaptable for use in connection with my machine.

Other objects and advantages of the invention will appear more fully hereinafter.

With the foregoing objects in view the invention consists of a machine of the class described comprising certain improved features and novel combinations of parts, appearing more fully hereinafter.

In the accompanying drawings, Figure 1 is a view of my complete machine shown equipped with a trimmer and also with a calk-sharpener; Fig. 2, a perspective view of the hanging bracket and devices carried thereby; Fig. 3, a vertical section of the same; Fig. 4, a vertical section of one of the hanger-couplings; Fig. 5, an elevation of one of the tool-holders; Fig. 6, a longitudinal section of the same with the handles removed; Figs. 7 and 8, similar views, respectively, as the foregoing, but showing another form of holder; Fig. 9, a view of a section of my improved flexible shaft; Fig. 10, a cross-section taken through one of the links and boxes; Fig. 11, a detail view of one of the hooks and Fig. 12 a view of the shaft-coupling mechanism.

There is a bracket 1, having three arms which are secured to the ceiling of the room or apartment where the device is to be used. This bracket has a hub 2, and on the lower end of this hub or sleeve there is a collar 3.

The numeral 4 designates a double coupling which is secured to the hub between the collar and the bracket and has sockets 5 and 6 running therethrough on opposite sides of the hub.

The numeral 7 designates a shaft or spindle which passes loosely through the hub. On the upper end of this spindle there is a pulley 8, and on the lower end below the bracket there is a double pulley 9. Owing to this construction it will be observed that the friction of the shaft is only with the hub.

There are two hanger rods or bars 10 and 11, which are received in the sockets 5 and 6 and project therefrom in opposite directions. At the ends of the hanger-rods there are clevises 12 and 13, having pins or bolts 14. There are two hanger-couplings 15 and 16, which being duplicates a description of one will suffice. Each has an upper yoke 17, fitted in the clevis and secured by the pin 14. Each hanger-coupling also has a sleeve 18, and 19 designates a vertical spindle which lies within the sleeve and has its upper end projecting into the yoke. This spindle carries near its upper end a clutch member 20, and has a collar 21 near its lower end, so that its up-and-down thrust is prevented. The spindle is cut away at its lower end and provided with a transverse coupling-pin 22.

The numeral 23 designates a pulley which lies within the yoke and is journaled on the spindle, this pulley having a clutch 24, adapted to engage with the clutch 20, and provided with a peripheral groove 25.

The numeral 26 designates a shifter having a portion received in the groove 25, and 27 is a pin which passes through a slot 28 in the shifter and into the yoke.

At 26' is shown a spring which has one end connected to the shifter, and 27' is a locking-pin secured to the free end of the spring and provided with an eye. The shifter itself has an opening 28', adapted to receive the said pin, and there are openings 29' made in the yoke which are adapted to receive the pin. There are two strings or cords 29 and 30, which are connected to the lower end of the shifter at 30', and the cord 29 passes through the eye of the pin 27' and also through the pin 27. Provision is thereby made for holding the pulley in coupled or uncoupled position, as the case may be. By pulling on cord 29 the locking-pin is pulled out of its opening in the yoke and the shifter is raised, thereby disengaging the pulley from the spindle. By pulling on the cord 30, after first releasing the pin by pulling the cord 29, the shifter is turned downwardly and the pulley brought into engagement with the spindle.

The numerals 33 and 34 designate cords or bands which run in the groove of the double pulley 9 and over the portions 23.

It will thus be seen that either spindle can be operated independently of the other or they can be operated simultaneously. For each hanger-coupling there is a sleeve 35, which fits over the sleeve 18, and is secured thereto by a set-screw. The ears of this sleeve afford means whereby the tool-holder can be connected, if desirable.

Before describing my improved flexible shaft I will explain the construction of the tool-holders which are shown in Figs. 5 to 8, inclusive. Referring now to Figs. 5 and 6, this holder has a shank 36 cut away at its end and provided with a coupling-pin 37 for the flexible shaft. It is formed with a collar 38 and with a fixed tool-clamp member 39.

The numeral 40 designates an adjustable clamp member, and 41 is a screw for securing said member against the tool. It will be observed that there are two dust-grooves 39'. There is a journal-box 42, which encircles the shank and is provided with a shoulder 43, against which the collar 38 abuts.

The numeral 44 designates a nut which screws on the shank against the opposite end of the box and prevents relative longitudinal movement of the same to the shank. There is a coupling-sleeve 45 which fits over the reduced or tapered portion of the box, and the case or covering for the flexible shaft fits over and is connected to this sleeve. It will be observed that both the sleeve and the box are peripherally grooved at 46.

The numerals 47 and 48 designate clamp-sections which fit in the groove, and 49 and 50 are handles, while 51 and 52 designate bolts which secure the handles between the ears of the clamp members and secure the clamp members tightly to the box or coupling-sleeve, as the case may be.

It will be observed that by loosening the bolts the handles can be adjusted to any desired extent, so that they will be in proper position for the use of the operator, thereby permitting trimming or sharpening of the calks of the horseshoe while the same is on the animal.

The hoof cutter or trimmer consists of an annular band having teeth punched therethrough and a hub which is received between the clamp members 39 and 40. This cutter is shown at 53. Of course an emery-wheel can be substituted for the cutter, and, in fact, any rotary tool can be employed.

The construction shown in Figs. 7 and 8 is the same as that just described, with the exceptions of the coupling-sleeve and the handles. The coupling-sleeve is shown at 54 and has ears 55. This sleeve fits over the reduced portion of the box 46, and it also affords attachment for the case of the flexible shaft. The handles are shown at 56 and are provided with bifurcated ends, which straddle the ears and are adjustably secured thereto by the bolts 57.

58 designates the castings for the flexible shafts, the same fitting up into the sleeves 35, being secured thereto by the set-screw shown.

My improved flexible shaft will now be described. There are a series of links 59, which have collars 60 and are formed into eyes 61 at their ends. It will be observed that these eyes are not complete, but have portions touching. The eyes of adjacent links are locked, as shown, but when it is desired to separate them all that is necessary is to spread the eyes. Of course, if preferable, I can form these eyes solid. I employ journal-boxes consisting of half-sections 62, which embrace the shank of the link and have sleeves located between the collars of said link. A suitable elastic band 63 surrounds these sections of the box and holds them together.

If preferable, a material could be employed in substitution for the band which would be adapted to hold a lubricant, so as to feed the same to the revolving links. The coupling-hooks are shown at 64, the same consisting of a single piece of metal interlocked with the eye of the last link and having hooked ends which lie parallel and are adapted to hook over the coupling-pins and straddle the reduced portions of the shanks of the tool-holders and the vertical spindles journaled in the hanger-couplings. The boxes fit snugly in the flexible-shaft casings and the links turn in said boxes. Owing to the construction of the shafting the same can be revolved at a great number of revolutions and yet remain perfectly cool.

There are many slight changes which could be resorted to in carrying out the invention without detracting from any of the advantages thereof, and hence I do not limit myself to the precise construction herein shown and described, but consider I am entitled to all such changes as properly come within the spirit and scope of the invention.

Having thus described the invention, what is claimed as new, and desired to be secured by Letters Patent, is—

1. In a device of the class described, the combination with a hanger-bracket having a hub, of a shaft journaled in the hub, pulleys carried by said shaft, an arm connected to the hub, a rotary tool carried by the arm and operated by a pulley, and a belt running over the tool and a pulley of the shaft.

2. In a device of the class described, the combination with a hanger-bracket having a hub, of a shaft journaled in said hub, pulleys carried by said shaft, a coupling on the hub which has sockets, hanger-rods secured in the sockets and extending in opposite directions, flexible shafts depending from the hanger-rods, tools carried by said shafts, pulleys on the shafts and bands running over the said pulleys and those on the shaft journaled in the hub.

3. In a device of the class described, the combination with a hanger-coupling and a spindle journaled therein, of a tool actuated by the spindle, a clutch carried by the spindle, a pulley running on the spindle and provided with a clutch, and means for shifting said pulley.

4. In a device of the class described, the combination with a hanger-coupling, of a spindle journaled therein, a tool operated by said spindle, a clutch member on the spindle, a pulley running on the spindle and having a clutch member, a slidable shifter connected to the hanger-coupling and adapted to actuate the tool, an eye secured to the hanger-coupling, and cords connected to the shifter, one of which passes through the eye.

5. In a device of the class described, the combination with a hanger-coupling, of a spindle journaled therein, a tool operated by the spindle, a pulley running on the spindle, a shifter for said pulley, a spring connected thereto, a locking-pin connected to the spring and adapted to work through an opening in the shifter and be received in openings in the hanger-coupling, an upper eye and cords both of which are connected to the lower portion of the shifter and one of which runs through the locking-pin and through the upper eye.

6. In a device of the class described, a tool-holder consisting of a shank having a means for holding the tool and provided with a collar, a box that loosely encircles the shank and abuts on the collar, and a nut on the shank which abuts on the box.

7. In a device of the class described, a tool-holder comprising a shank having tool-holding means and provided with a collar, a box loosely encircling the shank and provided with an enlarged mouth and an inner shoulder, which mouth receives the collar and the shoulder abuts thereagainst, a nut secured on the shank and abutting against the other end of the box, and a coupling-sleeve fitted over the box.

8. In a device of the class described, a tool-holder comprising a shank and tool-holding means carried thereby, a box loosely encircling the shank, and arms or handles pivoted to the box on opposite sides and adapted for attachment.

9. In a device of the class described, a tool-holder comprising a shank having tool-holding means, a box loosely encircling the said shank, clamping members encircling the box, handles fitted in between the ends of the clamp members and bolts passing through the handles and the clamp members.

10. In a device of the class described, a flexible shaft comprising interlocked links having shoulders, and separable boxes encircling the links and located between the shoulders.

11. In a device of the class described, a flexible shaft comprising links interlocked with each other and having shoulders, and boxes encircling the links between the shoulders and formed in separable halves, and bands encircling the sections of the boxes and holding them together.

12. In a device of the class described, a flexible shaft comprising links interlocked with each other, and a hook made from a single piece of material which is interlocked with the last link and has its ends bent into separated hooks.

In testimony whereof I have signed this specification in the presence of two subscribing witnesses.

ALVIA BYRON SMITH.

Witnesses:
MILTON A. BROOKS,
CHARLIE W. SMITH.